(12) United States Patent
Pena-Nieves et al.

(10) Patent No.: US 6,816,798 B2
(45) Date of Patent: Nov. 9, 2004

(54) NETWORK-BASED METHOD AND SYSTEM FOR ANALYZING AND DISPLAYING RELIABILITY DATA

(75) Inventors: Julio A. Pena-Nieves, Vega Alta, PR (US); Theodore D. Hill, III, West Hartford, CT (US); Alan Luis Arvidson, Burlington, CT (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 09/748,577

(22) Filed: Dec. 22, 2000

(65) Prior Publication Data

US 2002/0113792 A1 Aug. 22, 2002

(51) Int. Cl.[7] .......................... G06F 19/00; G06F 9/455
(52) U.S. Cl. ........................... 702/84; 342/93; 700/29; 701/29; 702/22; 702/186; 703/24
(58) Field of Search ...................... 702/22, 81, 83, 702/84, 85, 186; 700/29, 108, 109, 110; 701/29; 703/24; 342/93

(56) References Cited

U.S. PATENT DOCUMENTS

| | | | |
|---|---|---|---|
| 5,499,030 A | * | 3/1996 | Wicks et al. .................. 342/93 |
| 5,659,731 A | | 8/1997 | Gustafson |
| 5,710,700 A | * | 1/1998 | Kurtzberg et al. ............ 700/29 |
| 5,757,659 A | * | 5/1998 | Arai et al. .................... 702/22 |
| 6,047,234 A | | 4/2000 | Cherveny et al. |
| 6,055,463 A | | 4/2000 | Cheong et al. |
| 6,061,640 A | | 5/2000 | Tanaka et al. |
| 6,094,674 A | | 7/2000 | Hattori et al. |
| 6,115,713 A | | 9/2000 | Pascucci et al. |
| 6,128,543 A | | 10/2000 | Hitchner |
| 6,192,319 B1 | | 2/2001 | Simonson et al. |
| 6,192,354 B1 | | 2/2001 | Bigus et al. |
| 6,205,413 B1 | * | 3/2001 | Bisdikian et al. ............. 703/24 |
| 6,223,173 B1 | | 4/2001 | Wakio et al. |
| 6,240,460 B1 | | 5/2001 | Mitsutake et al. |
| 6,246,681 B1 | | 6/2001 | Humphrey et al. |
| 6,278,920 B1 | | 8/2001 | Hebberd |
| 6,405,108 B1 | * | 6/2002 | Patel et al. ................... 701/29 |
| 6,643,613 B2 | * | 11/2003 | McGee et al. .............. 702/186 |

* cited by examiner

*Primary Examiner*—John Barlow
*Assistant Examiner*—John Le
(74) *Attorney, Agent, or Firm*—Armstrong Teasdale LLP

(57) ABSTRACT

A network-based method and system for analyzing and displaying reliability data from a user is provided. The method includes recording reliability data, obtaining unreliability plots, obtaining Weibull distribution parameters, creating control charts for those parameters over time, and obtaining hypothesis tests to ensure reliability has not changed due to process variation.

18 Claims, 12 Drawing Sheets

Reliability Summary Report

NETWORK-BASED METHOD AND SYSTEM FOR ANALYZING AND DISPLAYING RELIABILITY DATA

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to computer network-based systems and more particularly to a network-based method and system for collecting, analyzing, and reporting reliability data.

Superior product and system reliability is achieved when reliability tools are integral parts of development, design, manufacturing, and service processes. Historically quality control efforts have been directed toward minimizing the number of product units that do not meet dimensional and/or performance criteria before leaving the manufacturing plant. This limited approach does not suffice in ascertaining failure modes, to estimate the likely impact of a potential corrective action, or to follow the incidence and nature of product failures over time. It also makes it difficult to provide objectively determined product life expectancy data to prospective customers.

Therefore it would be desirable to provide a system and method to analyze reliability data for facilities running reliability tests to allow users to ascertain overall failure rates, to dissect those overall rates into failure rates for specified failure modes, and to obtain plots and parameters as a function of time. It would further be desirable if the reliability data were accessible at sites remote from the facility to minimize the time and effort necessary to compile and submit such data to a remote site.

BRIEF SUMMARY OF THE INVENTION

The present invention includes a tool that allows the user to record reliability data, obtain unreliability plots, obtain Weibull distribution parameters, create control charts for those parameters over time, and obtain hypothesis tests to ensure reliability has not changed due to process variation. The tool allows users to identify variations that could affect the overall reliability of products through control charts that serve as an early warning for changes in product and system life by plotting shape ($\beta$) and scale ($\eta$) parameters. The tool also allows users to obtain plots and statistics for specific failure modes that may appear. A system of failure mode codes facilitates filtering of the data.

The tool allows analysis of failure incidence and modes of failure over time, and provides an estimate of the likely impact of an action designed to improve the reliability of a given component of a product. It also provides objectively determined life expectancy data for a product, which confers a marketing advantage. Moreover, users can access the tool over the Internet and have access to reliability data for a plant located anywhere in the world.

DETAILED DESCRIPTION OF THE INVENTION

Figure 1:
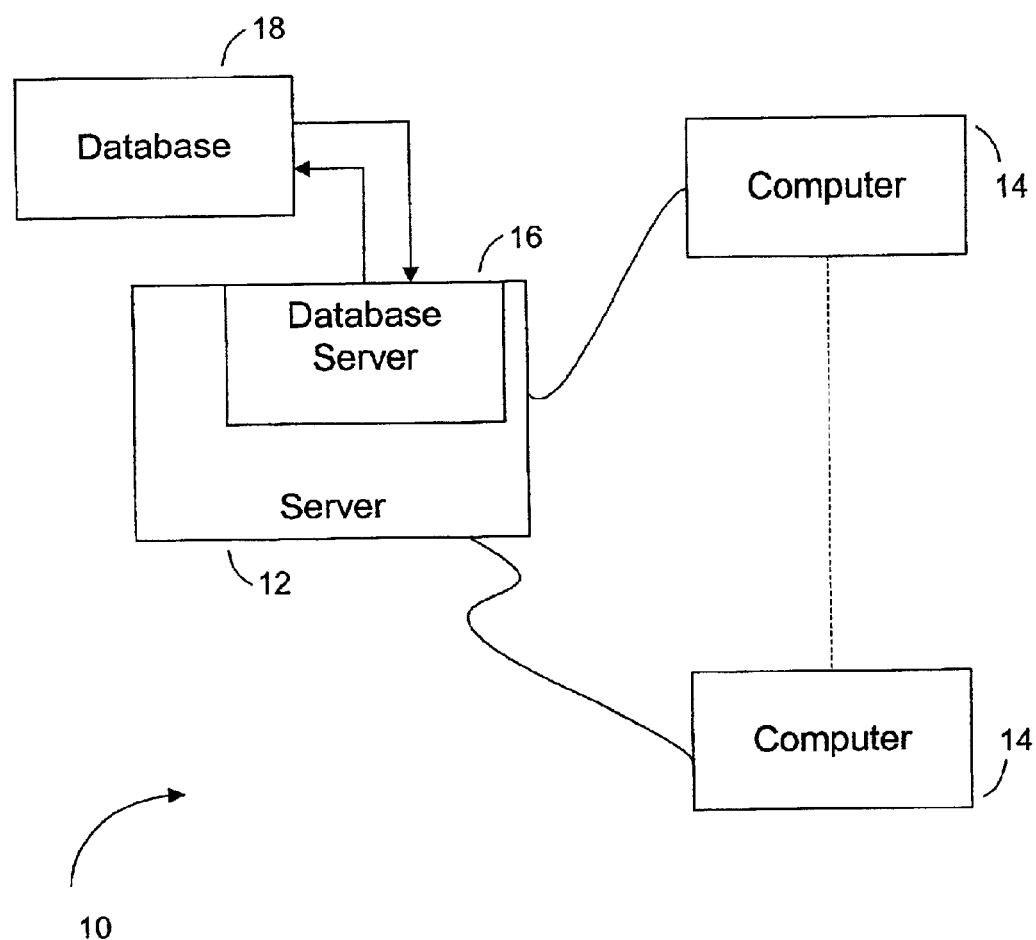
FIG. 1 is a block diagram of a system in accordance with one embodiment of the present invention.

FIG. 1 is a block diagram of a system 10 in accordance with one embodiment of the present invention. System 10 includes a server sub-system 12, sometimes referred to herein as server 12, and a plurality of user devices 14 connected to server 12. In one embodiment, devices 14 are computers including a web browser, and server 12 is accessible to devices 14 via a network such as an intranet or the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed ISDN lines. Alternatively, devices 14 are any device capable of interconnecting to a network including a network-based phone or other network-based connectable equipment. Server 12 includes a database server 16 connected to a centralized database 18 containing reliability information. In one embodiment, centralized database 18 is stored on database server 16 and can be accessed by potential users at one of user devices 14 by logging onto server sub-system 12 through one of user devices 14. In an alternative embodiment centralized database 18 is stored remotely from server 12.

Figure 2:
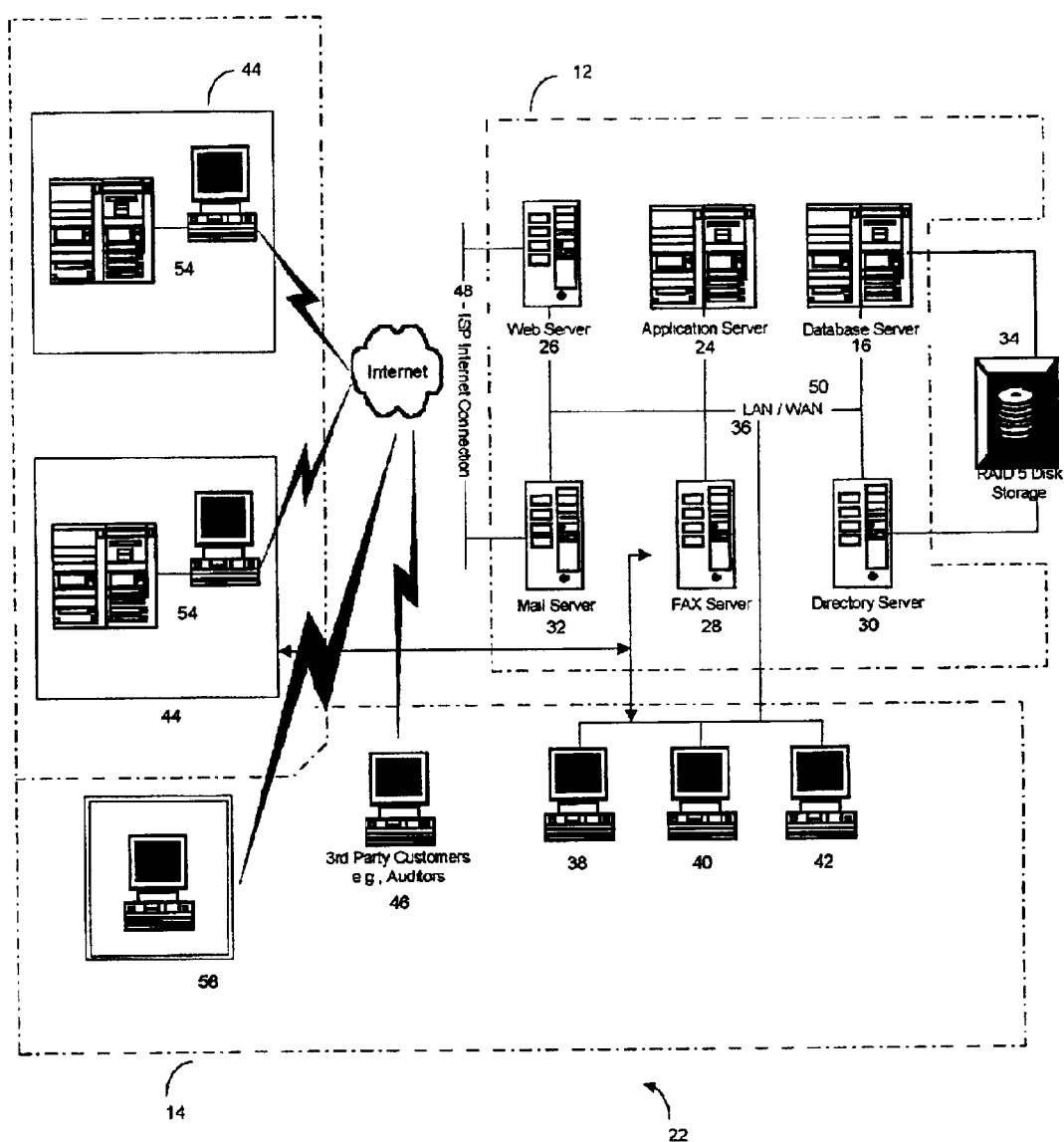
FIG. 2 is an expanded version block diagram of an exemplary embodiment of a server architecture of an alternative system.

FIG. 2 is an expanded version block diagram of an exemplary embodiment of a server architecture of a system 22. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to third parties, e.g., users, 46 via an ISP Internet connection 48. The communication in the exemplary embodiment is illustrated as being performed via the Internet, however, any other wide area network (WAN) type communication can be used in other embodiments, i.e., the systems and processes are not limited to being practiced via the Internet. In addition, and rather than a WAN 50, local area network 36 could be used in place of WAN 50.

In the exemplary embodiment, any employee 44 or user 46 having a workstation 54 can access server sub-system 12. One of user devices 14 includes a workstation 54 located at a remote location. Workstations 54 are personal computers having a web browser. Also, workstations 54 are configured to communicate with server sub-system 12. Furthermore, fax server 28 communicates with employees 44 and users 46 located outside the business entity and any of the remotely located user systems, including a user system 56 via a telephone link. Fax server 28 is configured to communicate with other workstations 38, 40, and 42 as well.

Figure 3:
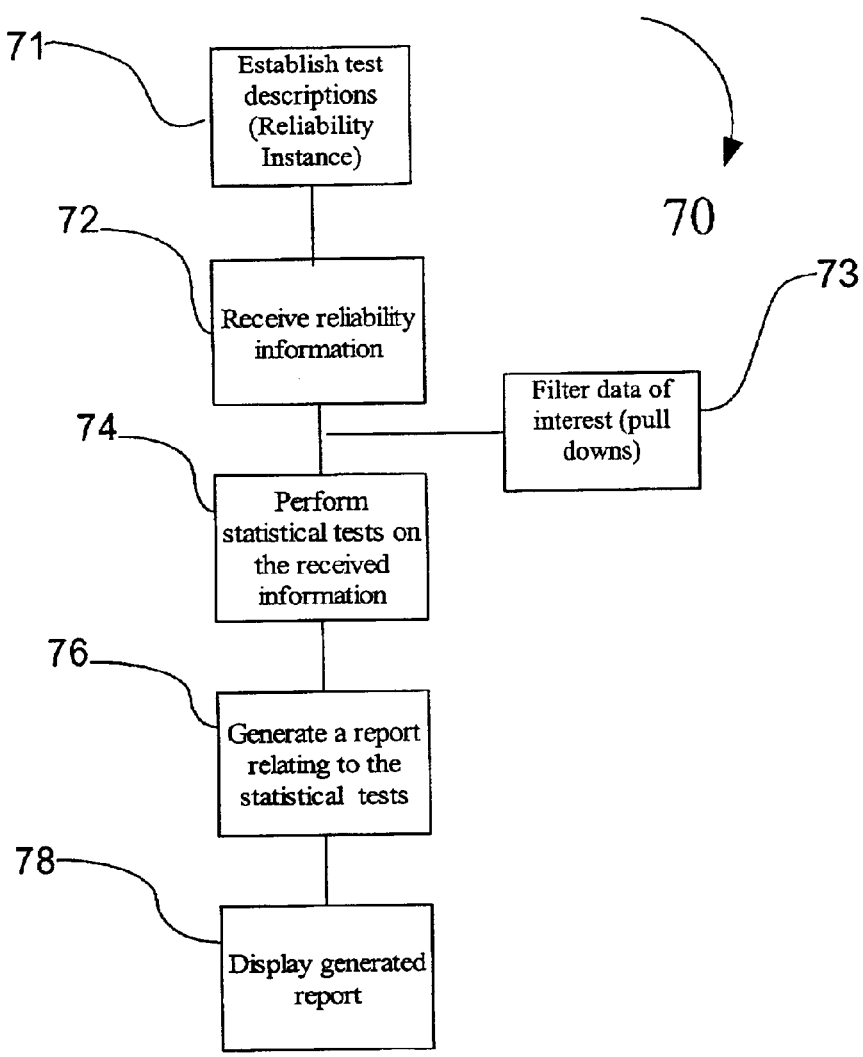
FIG. 3 is a flow diagram of a network-based method for analyzing and displaying reliability data.

FIG. 3 is a flow diagram 70 for a network-based method for analyzing and displaying reliability data. In one embodiment, a system administrator establishes 71 the reliability instances or test specifications. The user inputs information into a device (such as device 14 shown in FIG. 1) that transmits the information to a server (such as server 12 shown in FIG. 1). The data is received 72 through specified filters 73 via a graphical user interface, as will be described in greater detail below.

Server 12 performs 74 statistical tests on the received reliability information based on the filters (pull downs) selected. In one embodiment, the statistical tests are stored on server 12. In an alternative embodiment, the statistical tests are stored on a computer remote from server 12.

System 10 then generates 76 a report in accordance with the preferences selected by the user. Server 12 then displays 78 the generated report to user device 14 so that the user can view the report.

Figure 4:
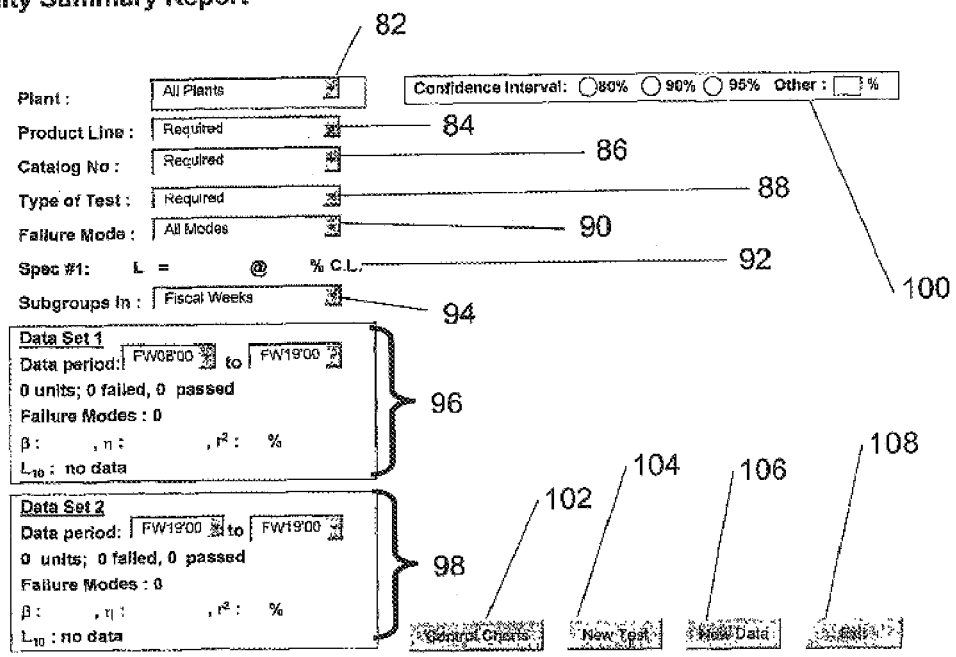
FIG. 4 is an exemplary embodiment of a Reliability Summary Report page for reporting purposes that includes a plurality of pull down menus to be used when supplying information to the system shown in FIG. 3.

FIG. 4 is an exemplary embodiment of a Reliability Summary Report page, as depicted in screen shot 80, which includes a plurality of pull down menus to be used when supplying information to system 10 (shown in FIG. 1). Screen shot 80 includes a Plant pull down menu 82, a Product Line pull down menu 84, a Catalog No. pull down menu 86, a Type of Test pull down menu 88, a Failure Mode pull down menu 90, a Specification #1 display area 92, and a Subgroups In pull down menu 94. Screen shot 80 also includes a Data Set 1 area 96, which includes pull down menus for specifying a data period and display fields for indicating a total number of units, a number of units failed, a number of units passed, a number of failure modes, a beta parameter (defined below), an eta parameter (defined below), an $r^2$ parameter (defined below) and an $L_{10}$ parameter (defined below). Screen shot 80 further includes a Data Set 2 area 98, which includes pull down menus for specifying a data period and display fields for indicating a total number of units, a number of units failed, a number of units passed, a number of failure modes, a beta parameter (defined below), an eta parameter (defined below), an $r^2$ parameter (defined below) and an $L_{10}$ parameter (defined below). Screen shot 80 still further includes a Confidence Interval selection area 100, a Control Charts radio button 102, a New Test radio button 104, a New Data radio button 106, and an Exit radio button 108. Selection of Control Charts radio button 102 replaces plots with control charts, as defined below, while selection of New Test radio button 104 takes the user to a data collection window with the current setup. Selection to New Data radio button 106 takes the user to a data collection window with a current setup, while selection of Exit radio button 108 allows the user to exit system 10 (shown in FIG. 1).

Figure 5:
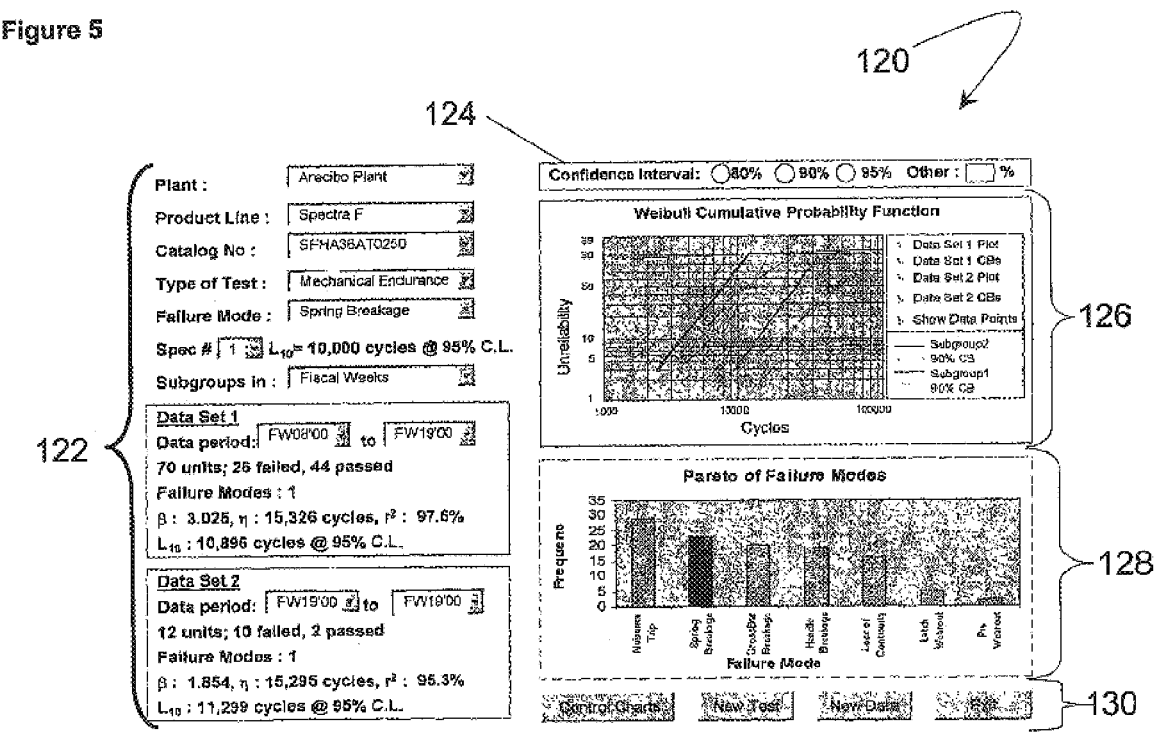
FIG. 5 is an exemplary embodiment of a report downloaded and displayed by the system shown in FIG. 3 as Weibull & Pareto plots when the user has selected the appropriate filters.

FIG. 5 is an exemplary embodiment of a Reliability Interface results page, as depicted in screen shot 120, in which display area 122 and Confidence Interval selection area 124 show an exemplary choice of variables corresponding to items 82 through 100 in FIG. 4. Screen shot 120 also includes a Weibull Cumulative Probability Function plot 126, and a Pareto of Failure Modes display area 128, as well as a set of radio buttons 130 that correspond to radio buttons 102, 104, 106 and 108 in FIG. 4. The Weibull Plot overlays the two data sets plot for comparison purposes. Also, the Failure Modes Pareto colors the failure mode(s) under study differently.

Figure 6:
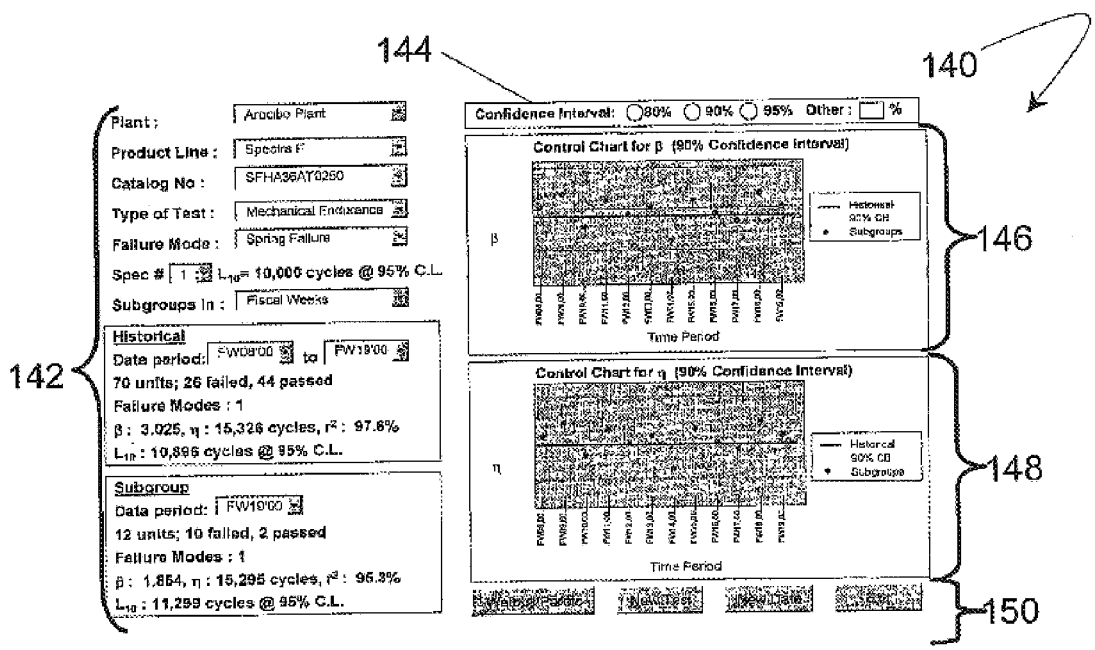
FIG. 6 is an exemplary embodiment of a report downloaded and displayed by the server system shown in FIG. 3 as control charts when the user has selected the appropriate filters.

FIG. 6 is an exemplary embodiment of a second Reliability Interface results page, as depicted in screen shot 140, in which display area 142 and Confidence Interval selection area 144 show another exemplary choice of variables corresponding to items 82 through 100 in FIG. 4. Screen shot 140 also includes a Control Chart for Beta plot 146, and a Control Chart for Eta plot 148, as well as a set of radio buttons 150 that correspond to radio buttons 102, 104, 106 and 108 in FIG. 4.

Figure 7:
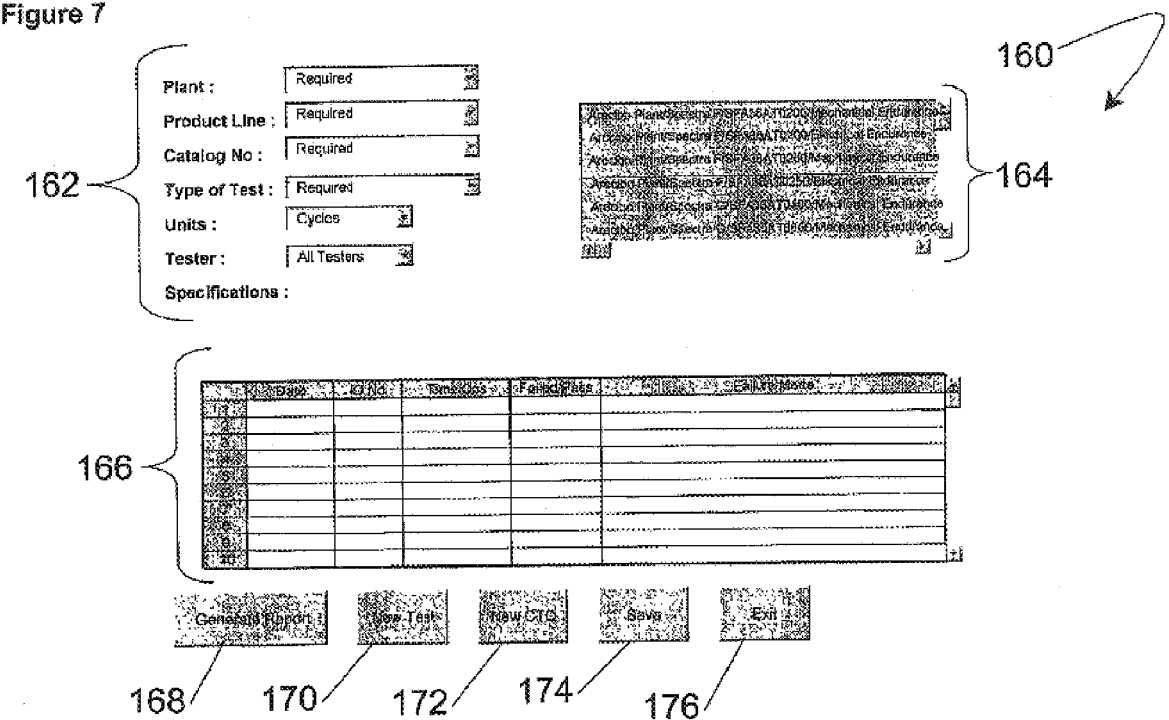
FIG. 7 is an exemplary embodiment of a user interface for data entry downloaded and displayed by the server system (shown in FIG. 3) for the user to select the reliability instance (characteristic test) of the data to be entered.

FIG. 7 is an exemplary embodiment of a Reliability Data Collection page, as depicted in a screen shot 160, which includes a set of pull down menus 162 for specifying a plant, a product line, a catalog number, a type of test, a number of units, a tester, and any specifications. Screen shot 160 also includes a pull down menu 164 for specifying a type of test, and a data table 166 that displays the date, identification number, failure time, failed/pass, and a failure mode columns. Screen shot 160 also includes a Generate Report radio button 168, a New Test radio button 170, a New CTQ radio button 172, a Save radio button 174, and an Exit radio button 176. Selection of Generate Report radio button 168 causes system 10 (shown in FIG. 1) to display a report window, while selection of New Test radio button 170 restores this page with all default values. Selection of New CTQ radio button 172 causes system 10 to display a CTQ setup window (described below), while selection of Save radio button 174 saves input data and calculates parameters. Selection of Exit radio button 176 causes the user to exit system 10.

Figure 8:
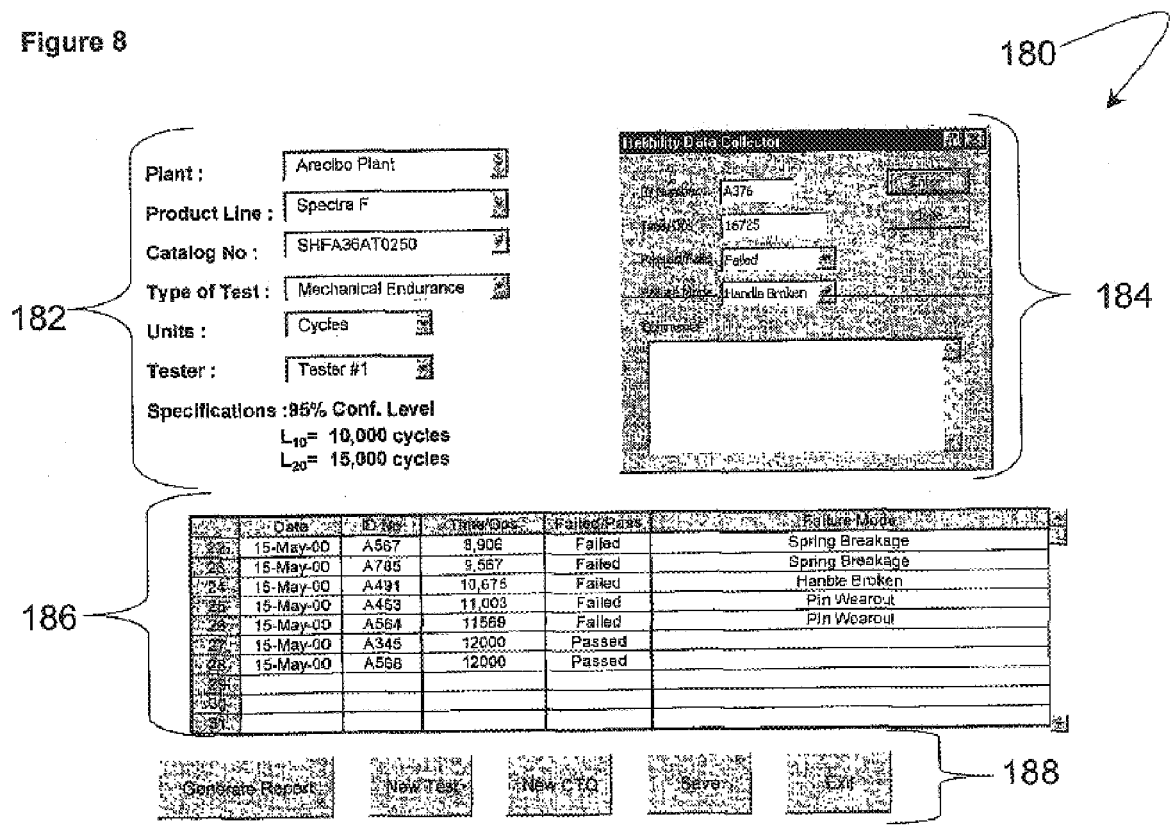
FIG. 8 is an exemplary embodiment of a user interface downloaded and displayed by the server system (shown in FIG. 3) for the user to enter the data points.

FIG. 8 is an exemplary embodiment of a second Reliability Data Collection page, as depicted a screen shot 180, which includes a set of pull down menus 182 that show an exemplary choice of a plant, a product line, a catalog number, a type of test, a number of units, a tester, and a specification. Screen shot 180 also includes a Reliability Data Collector area 184 that appears to all-out data entry when all required fields have been selected. Selection of an Enter button in area 184 causes any new data to appear in data table 186, which corresponds to report area 166 in FIG. 7. Screen shot 180 also includes a set 188 of buttons that allow a choice of Generate Report, New Test, New CTQ, Save, and Exit options.

Figure 9:
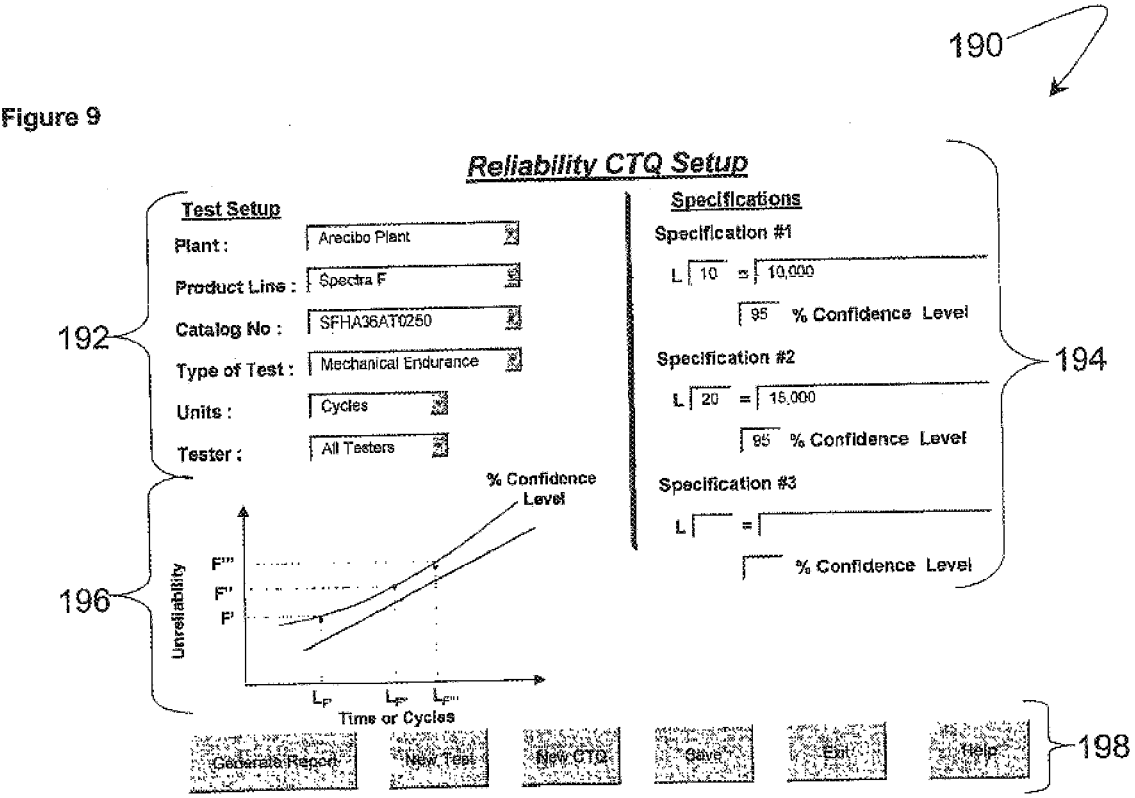
FIG. 9 is an exemplary embodiment of a Reliability CTQ Setup page.

FIG. 9 is an exemplary embodiment of a second Reliability CTQ Setup page, as depicted in a screen shot 190, which includes a set of pull down menus 192 that show an exemplary choice of a plant, a product line, a catalog number, a type of test, a number of units, and a tester. Screen shot 190 facilitates creation of the new test description of a reliability instance. Screen shot 190 also includes a Specifications area 194 that includes a set of Specification text boxes for specifying an $L_{10}$, a number of units, and a % Confidence Level for each of Specification #1, Specifications #2, and Specifications #3. Screen shot 190 also includes a plot 196 of Unreliability vs. Time or Cycles, to illustrate the concept of a reliability specification as well as a set 198 of radio buttons corresponding to radio buttons 168, 170, 172, 174, and 176 shown in FIG. 7.

The mathematical background of the statistical analysis of the data is described below. This method uses the Weibull function as the assumed distribution because of its flexibility in assuming various distribution profiles.

The life data for probability plotting has two axes: T, the actual failure time or cycles, and F, the failure cumulative probability or rank. Of the several methods of calculating F, median rank has been determined to be the best for skewed distributions. Medium rank has been used in the exemplary embodiment because: 1) Weibull distributions could be symmetrical or non-symmetrical; and 2) If the life data are normal (wearout failures) the mean, midpoint and the median should all be the same. The Weibull cumulative density function is given by:

$$F(t) = 1 - e^{-(\frac{t}{\eta})^\beta}$$

where $\beta$ and $\eta$ represent the shape and scale parameters of the Weibull distribution respectively. Beta values less than one correspond to early failures, while those of about 2 or greater represent wearout failures. Beta values near unity indicate random failures that can be used to estimate useful life. Eta represents the point at which 1/e of the units fail that corresponds to the midlife of a unit. The T and F axes are transferred to the linear form of the Weibull expression through use of $$\ln(t) = \frac{1}{\beta}\ln(-\ln(1 - F(t))) + \ln(\eta),$$

which is in the form of Y=bX+u. With the data transformed, the best linear unbiased estimate (abbreviated BLUE) can be obtained. In the exemplary embodiment, the method of least squares in X has been used. The method of least squares provides the lowest variance of all possible unbiased estimators of the regression parameters b and u. b and u are estimates of $\beta$ and $\eta$ by the relation shown in the following equations.

$$SS_x = \sum_{i=1}^{n}(x_i - \bar{x})^2 \qquad b = \frac{SS_{xy}}{SS_x}$$

$$SS_{xy} = \sum_{i=1}^{n}(x_i - \bar{x})(y_i - \bar{y}) \qquad u = \bar{y} - b\bar{x}$$

-continued $$SS_y = \sum_{i=1}^{n}(y_i - \bar{y})^2 \qquad r^2 = \frac{b * SS_{XY}}{SS_Y}$$

As a means to verify accuracy of the model's prediction, the coefficient of determination ($r^2$) is interpreted as the proportion of the variation in Y that is explained by the regression of Y with X. With the linear estimate, transforming back to Weibull's original form, the percentiles (T) and probabilities (F) can be calculated.

The time by when 10% of the units are expected to fail or $L_{10}$ is another statistic of interest in this module. This time is the Reliability Critical-to-Quality (CTQ) criterion for any given product. The $L_{10}$ is estimated with a certain confidence level (CL). For example, by substituting 0.10 as F in the F(T) equation from the Weibull model, the $L_{10}$ at 50% confidence level can be calculated since the line represents the Median (or 50%) Rank. In most cases a 90% confidence level is used. The 90 confidence level can be obtained using the confidence bounds. A non-parametric method is discussed below.

Figure 10:
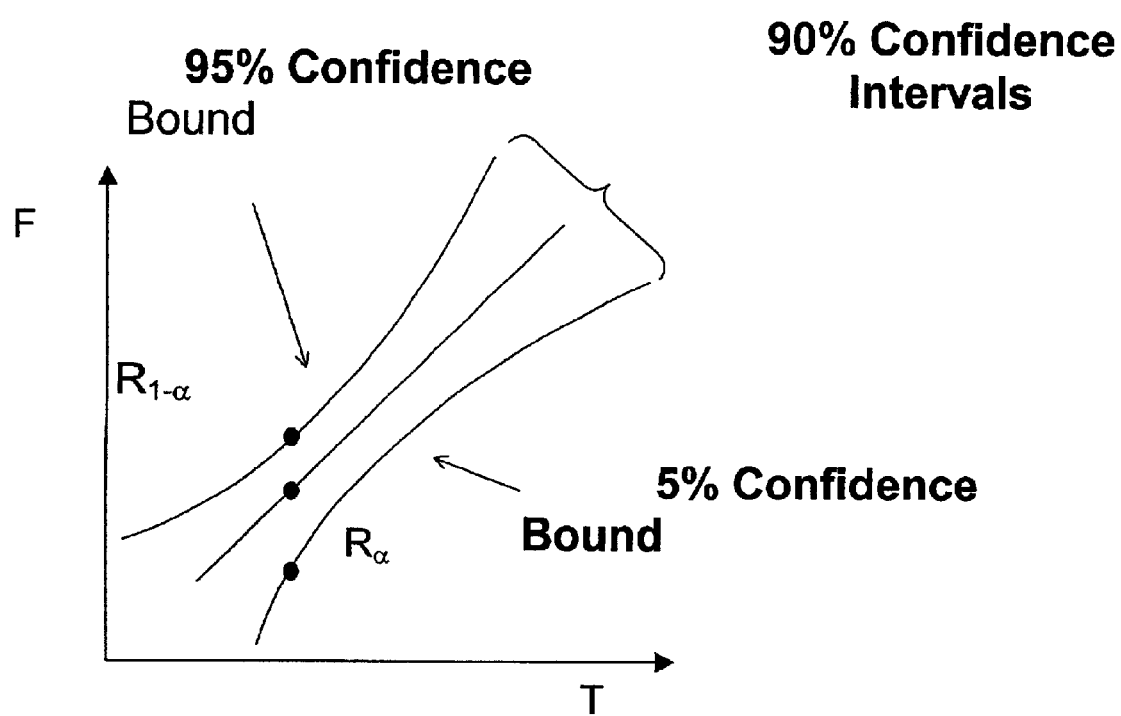
FIG. 10 shows a plot of F, the failure cumulative probability or rank, vs. T, the failure time or cycles with confidence bounds.
Figure 11:
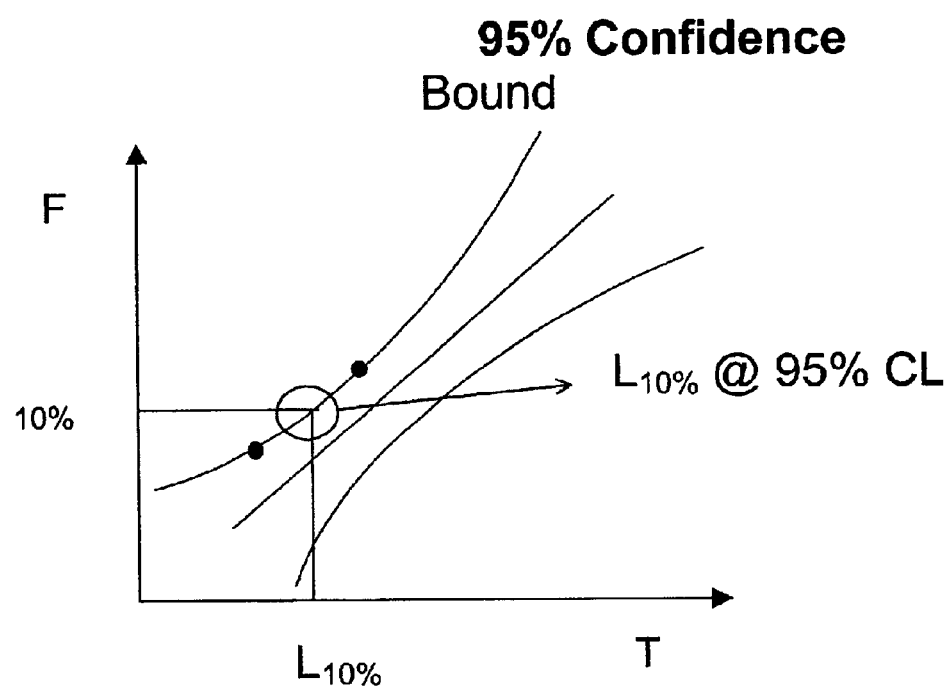
FIG. 11 shows a plot of F, the failure cumulative probability or rank, vs. T, the failure time or cycles with confidence bounds illustrating the concept of percentiles or $L_{X\%}$.

The confidence intervals represent the range for the expected variation in F at any given T and vice versa. This range includes limits that contain a specified percentage of variation, for example a 90% confidence interval contains 90% of the variation. The line obtained from the regression represents median rank and therefore 50% of the variation at each side. Consequently, the upper and lower limits or bounds of this 90% confidence interval are called the $\alpha$ and 1-$\alpha$ confidence bounds where 2$\alpha$-1 equals the specified confidence interval. FIG. 10 and FIG. 11 show how these bounds are used to make estimates at $\alpha$ and 1-$\alpha$ level. These limits are non-parametric curves that connect the $\alpha$ and 1-$\alpha$ ranks ($R_\alpha$ and $R_{1-\alpha}$) calculated for each failure k from a subgroup of size n as follows.

$$\alpha = \sum_{k=j}^{n}\binom{n}{k}R_{\alpha\%}(1 - R_{\alpha\%})^{n-k} \quad \text{(for lower rank)}$$

and $$1 - \alpha = \sum_{k=j}^{n}\binom{n}{k}R_{1-\alpha\%}(1 - R_{1-\alpha\%})^{n-k} \quad \text{(for upper rank)}$$

$$\text{where } \binom{n}{k} = \frac{n!}{k!(n-k)!}.$$

These ranks are plotted vertically along the median ranks of every failure point for the predicted time or cycles to failure. This means that the median rank value for every failure point is substituted in the F(T) expression as F, then the upper and lower ranks are plotted vertically along the t=T(F), as shown in FIG. 10 and FIG. 11. With these ranks calculated, any percentile (T) can be obtained at the confidence level of the corresponding bounds where the ranks lies by interpolation/extrapolation methods. For example, if the $L_{10}$ 10% is desired at 95% confidence level (CL), using the 95% confidence bound (a 90% confidence interval) an interpolation would have to be performed between the two data points with $R_{95\%}$ above and below 10%.

Figure 12:
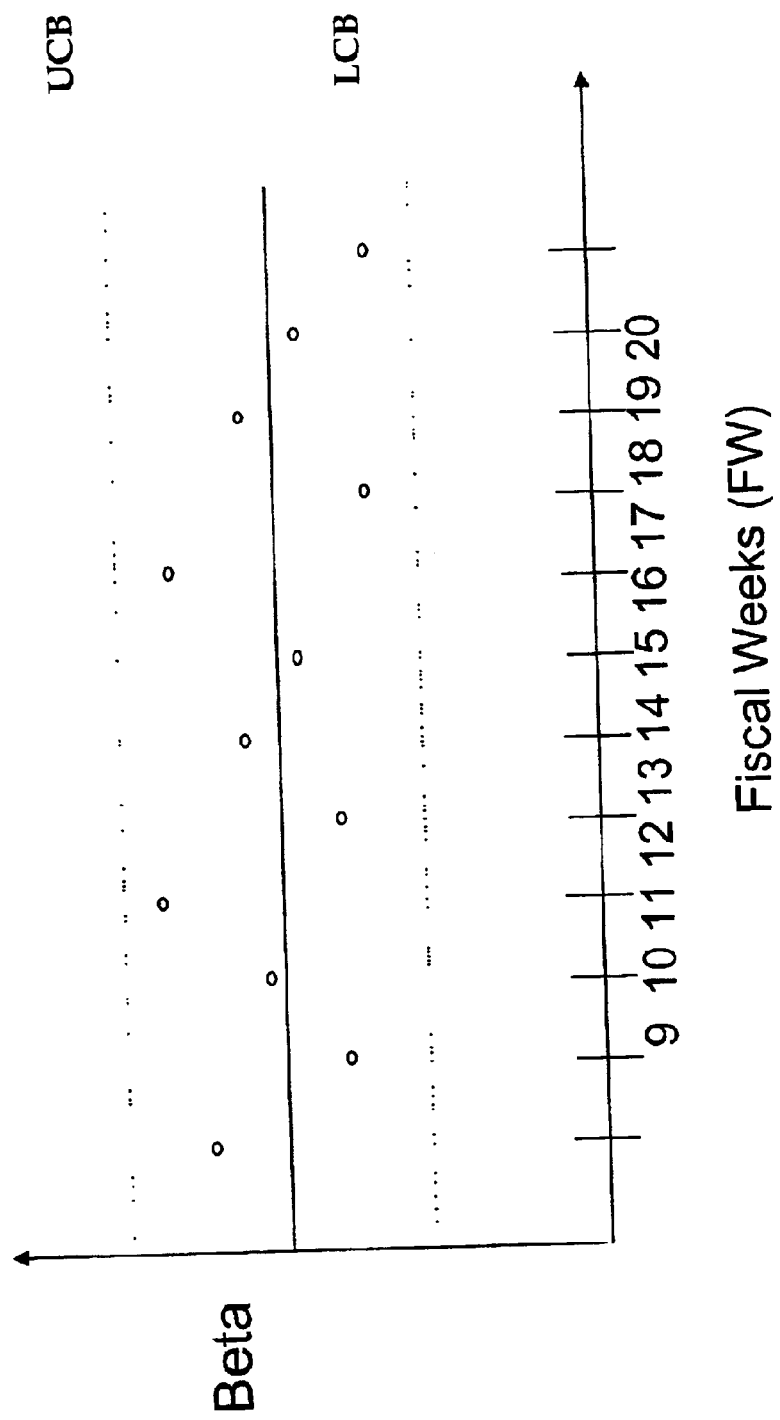
FIG. 12 shows control charts of beta, the shape of the Weibull distribution, vs. fiscal weeks (FW).

FIG. 12 shows control charts of beta, the shape of the Weibull distribution, vs. fiscal weeks (FW). A control chart is a graphical display of the variation of any targeted statistic during an industrial process through time. In the exemplary embodiment, the $\beta$ and $\eta$ parameters have been monitored since an instability of these values provides an early alarm of variation in the processes that affect reliability of the product or system. For both parameters the control chart plots four quantities, historical parameter (β, η), upper control bound (UCB), lower control bound (LCB), and subgroup parameters.

The user selects a grouping period that determines the number of points used in every plot. The grouping periods are by one of fiscal week, month, quarter and year. For instance, if the user selects that the data are grouped by fiscal weeks, a subgroup will contain all data points recorded between Monday and Sunday of that week. The control chart plots up to 12 subgroups back in data. The subgroup parameters are those calculated through use of the data contained in the grouping period specified by the user. The historic parameters are those calculated through use of the data contained between the period when the report is requested and the preceding twelve months, if the data are available. The control bounds are calculated through use of the confidence intervals for the parameters β and η. These are calculated as follows:

$$\beta_L = 1/(D \ast exp(1.049 K_\gamma/n^{1/2})) \text{ (lower beta limit)}$$

and $$\beta_U = 1/(D/exp(1.049 K_\gamma/n^{1/2})) \text{ (upper beta limit)}$$

$$\eta_L = exp(L - 1.081 K_\gamma(D/n^{1/2})) \text{ (lower eta limit)}$$

and $$\eta_U = exp(L + 1.081 K_\gamma(D/n^{1/2})) \text{ (upper eta limit)}$$

where $K_\gamma$ = the $[100(1+\gamma)/2]$th standard normal percentile $D = 0.7797 \ast$ standard deviation of the subgroup $L =$ subgroup mean $+ 0.5772 \ast D$ $n =$ subgroup size Any point falling out of those limits is an indicator that this point is from a different population than the collective group with a least a γ% confidence. These control bounds are to be recalculated after four new subgroups of data have been recorded to reduce sensitivity of the limits.

In use, system 10 (shown in FIG. 1) provides the user with a way of analyzing and displaying reliability data. This reliability module establishes a data collection system for manufacturing plants and facilities performing reliability testing. It provides easy data entry windows and complete reports that includes Weibull plots, failure mode Pareto plots, control charts for distribution parameters, and other life predictors.

While the invention has been described in terms of various specific embodiments, those skilled in the art will recognize that the invention can be practiced with modification within the spirit and scope of the claims.

What is claimed is:

1. A method for analyzing and displaying reliability data through use of a network-based system including a server and at least one device connected to the server via a network, said method comprising the steps of:
   receiving reliability information from a user via the device, wherein said receiving reliability information includes obtaining reliability information regarding a product;
   performing statistical tests on the received reliability information;
   generating a report relating to the statistical tests;
   displaying information related to the report;
   receiving a confidence level of a parameter of the product; and
   predicting a life of the product based, at least in part, on the confidence level.

2. A method according to claim 1 wherein said step of generating a report relating to the statistical tests further comprises the step of generating a plot of a Weibull cumulative probability function.

3. A method according to claim 2 wherein said step of generating a report relating to the statistical tests further comprises the step of generating a plot of the Weibull cumulative probability function of unreliability as a function of cycles.

4. A method according to claim 1 wherein said step of generating a report relating to the statistical tests further comprises the step of generating a Pareto histogram.

5. A method according to claim 4 wherein said step of generating a Pareto histogram further comprises the step of generating a Pareto histogram of failure mode.

6. A method according to claim 1 wherein said step of generating a report relating to the statistical tests further comprises the step of generating a control chart.

7. A method according to claim 1 wherein the reliability information is received from the user via a graphical user interface.

8. A system for analyzing and displaying reliability data, said system comprising:
   a device; and
   a server connected to said device and configured to receive reliability information from a user via said device, wherein the reliability information includes information regarding a product, said server further configured to:
   perform statistical tests on the received reliability information;
   generate a report relating to the statistical tests;
   display information related to the report;
   receive a confidence level of a parameter of the product; and
   predict a life of the product based, at least in part, on the confidence level.

9. A system according to claim 8 wherein said server further configured to download to the user the information related to the report.

10. A system according to claim 8 wherein said server further configured to generate a plot of a Weibull cumulative probability function.

11. A system according to claim 8 wherein said server further configured to generate a plot of a Weibull cumulative probability function of unreliability as a function of cycles.

12. A system according to claim 8 wherein said server further configured to generate a Pareto histogram.

13. A system according to claim 8 wherein said server further configured to generate a Pareto histogram of failure mode.

14. A system according to claim 8 wherein said server further configured to generate a control chart.

15. A system according to claim 8 wherein said server further configured to receive the reliability information from the user via a graphical user interface.

16. A system according to claim 8 wherein said device configured to be a server for a network of customer devices.

17. A system according to claim 8 wherein said server and said device are connected via a network.

18. A system according to claim 17 wherein said network is one of a wide area network, a local area network and the Internet.

* * * * *